United States Patent [19]

Nelson et al.

[11] Patent Number: 4,940,204
[45] Date of Patent: Jul. 10, 1990

[54] INSTRUMENT HAVING FLEXIBLE STAND

[75] Inventors: Michael D. Nelson; Heimen Wong, both of Seattle; Roger M. Trana, Bothell, all of Wash.

[73] Assignee: John Fluke Mfg. Co., Inc., Everett, Wash.

[21] Appl. No.: 413,959

[22] Filed: Sep. 28, 1989

[51] Int. Cl.$^5$ .............................. F16M 13/00
[52] U.S. Cl. ..................... 248/688; 248/455
[58] Field of Search ............ 248/674, 676, 126, 463, 248/688, 692, 462, 455

[56] References Cited

U.S. PATENT DOCUMENTS

| | | | |
|---|---|---|---|
| 1,363,664 | 12/1920 | Livingston | 248/688 |
| 2,052,120 | 8/1936 | Vaughan | 248/126 |
| 3,628,005 | 12/1971 | Rhoades | 248/126 X |
| 3,984,074 | 10/1976 | Forman et al. | 248/676 |
| 4,016,982 | 4/1977 | Schreiber | 248/688 X |
| 4,044,980 | 8/1977 | Cummins | 248/676 X |
| 4,113,212 | 9/1978 | Coriden | 248/688 X |
| 4,259,568 | 3/1981 | Dynesen | 248/676 X |
| 4,568,801 | 2/1986 | Gates et al. | 248/126 X |
| 4,819,266 | 4/1989 | Awakowicz et al. | 248/126 X |

Primary Examiner—David M. Purol
Attorney, Agent, or Firm—Stephen A. Becker

[57] ABSTRACT

A flexible stand permits an instrument housing or holster to which it is attached to be supported on a horizontal surface at any of a number of different viewing angles, to be hooked to a pipe or conduit, or to be suspended from a nail or the like. The stand comprises a skeletal member that is formed of a pair of annealed cartridge brass wires separated from each other and maintained parallel by a pair of plastic bridge members. The skeletal member is coated with thermoplastic polyester material, to form an assembly that is flexible, is non-brittle and exhibits substantially no mechanical memory so that it retains the shape to which the stand is manually formed by the user. One end of the stand is pivotally attached to the meter housing or holster, and an abutment member on the stand contacts a portion of the housing or holster to prevent further pivoting when the stand is pivoted to a particular angle.

28 Claims, 3 Drawing Sheets

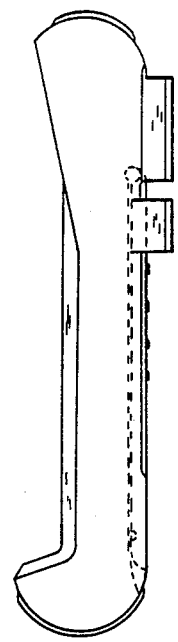
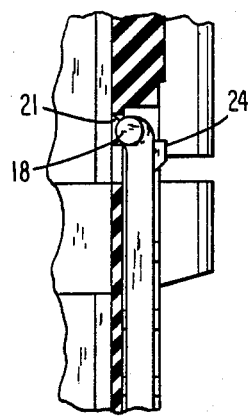
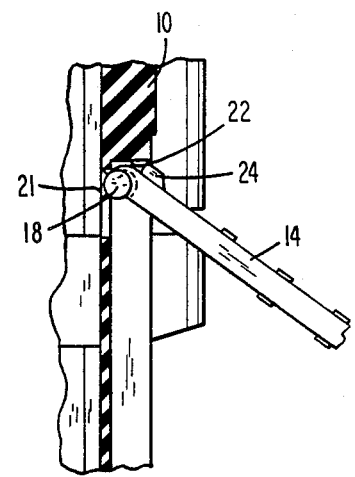
Fig. 4    Fig. 5A    Fig. 5B
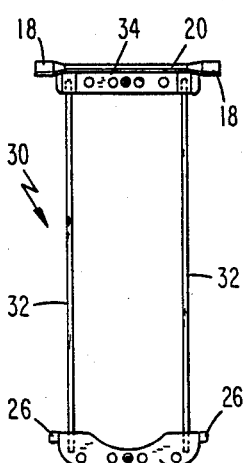
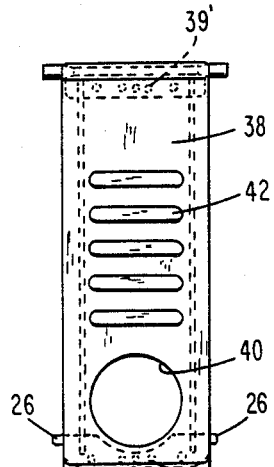
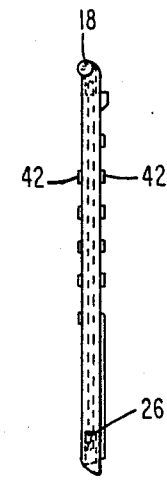
Fig. 6    Fig. 7    Fig. 8

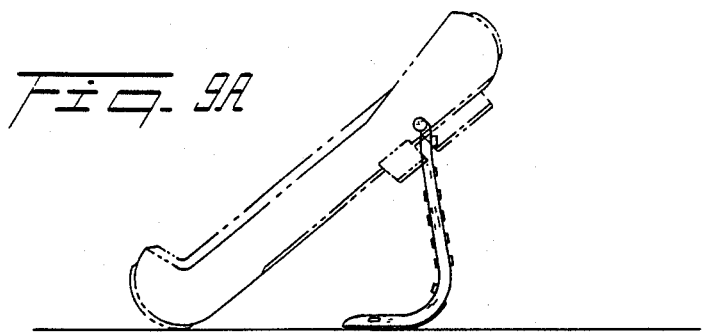
Fig. 9A
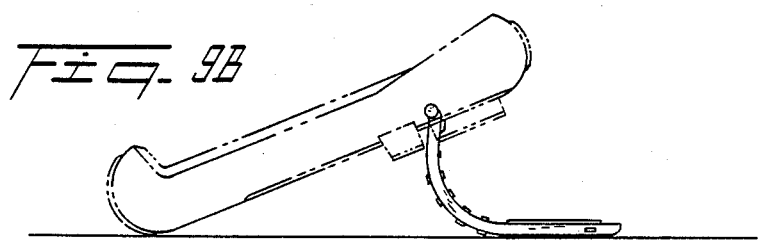
Fig. 9B
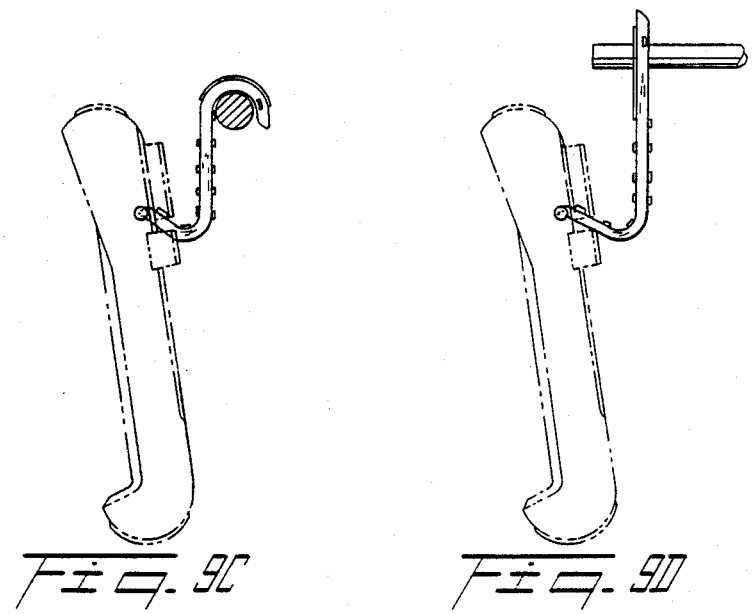
Fig. 9C
Fig. 9D

INSTRUMENT HAVING FLEXIBLE STAND

TECHNICAL FIELD

This invention relates generally to support stands for measurement instruments, and more particularly to an instrument support stand that is flexible and able to retain the shape to which it is manually formed by a user.

BACKGROUND ART

The housing of a measurement instrument, such as a multimeter, sometimes is equipped with a stand that enables the instrument to be positioned upright on a bench or other support surface for viewing. However, the stand ordinarily is capable of presenting the meter for viewing at only a single, fixed viewing angle. This is unsatisfactory since, in some circumstances, the user is not able to conveniently view the instrument at the angle presented by the stand.

In some applications, especially in industrial environments, the housing of the instrument may be retained in a holster that clips to a belt worn by the user or the holster may be carried by the user in some other manner. The holster usually will have a stand that is rigid and mounted pivotally to the holster to support the holster and instrument on a work surface such as a bench for testing. The angle through which the stand pivots on the holster, to a support position, is fixed, so that similar inconveniences as exist with the stand of an instrument housing occur for the holster as well.

DISCLOSURE OF THE INVENTION

Accordingly, one object of the invention is to provide a stand for an instrument housing or holster, that is adjustable to provide different instrument viewing angles.

Another object of the invention is to manually adjust the stand of an instrument housing or holster to accommodate different viewing angles of the instrument.

A further object of the invention is to provide an instrument stand that is conveniently manually operable to change its configuration to accommodate different viewing angles of the instrument.

It is additionally desirable to have the ability to mount a measurement instrument not only on a horizontal support surface, but also to a pipe or conduit or to a nail, stud or the like. Another object of the invention, therefore, is to enable an instrument housing or holster stand to be mounted to a pipe or conduit, or to a nail, stud or the like.

Manipulation of the stand sometimes has to be done by a user with only one hand, as the other may be occupied in carrying out a measurement. A further object of the invention, accordingly, is to provide an instrument housing or holster stand that can be manipulated by a user with only one hand.

These and other objects of the invention are satisfied by a stand for supporting the housing of, or holster for, a measurement instrument, wherein the stand comprises an elongated member extending outwardly from the housing or holster and being formed of a structure that is flexible, is non-brittle and has substantially no mechanical memory. By "no mechanical memory" is meant that the stand will remain in the configuration in which it is manually formed by the user by bending, and will not tend to creep toward the previous configuration.

The structure of the stand comprises a skeletal member that in turn is preferably comprised of a pair of lengths of annealed cartridge brass wire separated from each other and maintained parallel by a pair of bridge members. The bridge members preferably are made of plastic, and are molded respectively on opposite ends of the wire lengths. A thermoplastic polyester material covers at least a portion of the skeletal member, and one end of the stand is retained, preferably by pivot pins, to the housing or holster.

In the preferred embodiment, a pair of pivot pins extends outwardly from one end of the stand and is adapted to be seated in collars formed in a recessed portion of the housing or holster. Stand retaining tabs extend outwardly from opposite sides of the thermoplastic polyester material and are adapted to be releasably retained in corresponding recesses formed in the material.

In accordance with another aspect of the invention, an abutment member is formed on the outer surface of the thermoplastic polyester material near one end of the stand adjacent the housing or holster. The abutment member is positioned such that it contacts a portion of the housing or holster and limits further pivoting of the stand when the stand is pivoted to attain a predetermined angle with respect to the housing/holster.

In accordance with a further aspect of the invention, a series of parallel ribs is formed on a planar surface of the thermoplastic polyester material; the ribs form a non-slip surface when the stand is hooked around a pipe or conduit, or the like. The stand may also advantageously include an aperture for hanging the instrument on a nail, stud, or the like.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWING

FIG. 4 is a side view of the holster, with stand retracted.

FIG. 5A is a detail of the manner in which the stand is pivotally mounted to the holster.

FIG. 5B is a detail similar to FIG. 5A, with the stand in the support position.

FIG. 6 is a front view of the skeletal member forming framework for the stand.

FIG. 7 is a front view of the stand.

FIG. 8 is a side view of the stand.

FIGS. 9A and 9B are side views of the stand configured for supporting the holster in two different positions on a work surface.

FIG. 9C is a side view of the stand configured to be hooked to a pipe or conduit.

FIG. 9D is a side view of the stand configured to be suspended by a stud.

BEST MODE FOR PRACTICING THE INVENTION

Figure 1:
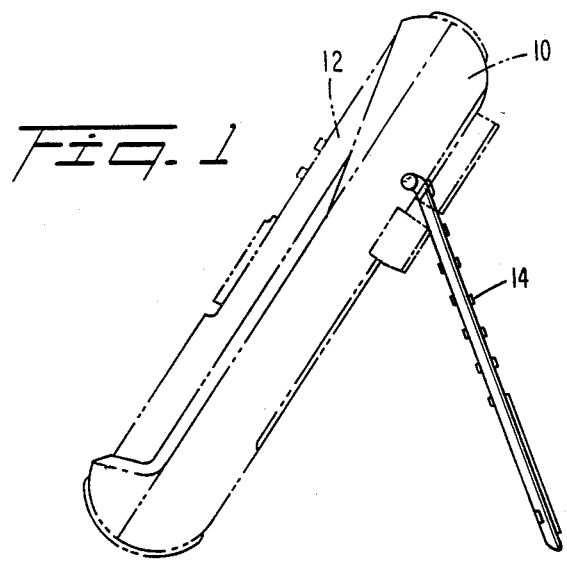
FIG. 1 is a side view of a holster, with stand formed in a planar configuration and pivoted into a support position.

The invention provides a stand for an instrument housing or holster, that is flexible, is non-brittle and has virtually no mechanical memory, i.e., retains the shape into which it is manually configured by the user. Thus, with reference to FIG. 1, a holster 10 for retaining an instrument 12 has generally a "clamshell" shape with an open region at the front of the holster for receiving and seating the instrument. When seated, the instrument 12 is presented to the user with its display (not shown) facing away from the holster, in convenient view by the user. The holster 10 is maintained in an upright position by a stand 14 provided in accordance with the invention. The stand 14 may be configured to attain a planar shape as shown in FIG. 1, and in that configuration is retained at an angle that is fixed with respect to the holster 10 for convenience to the user. However, the stand 14 is constructed in such a manner as to be capable of reconfiguration into other shapes, such as the ones shown in FIGS. 9A and 9B for mounting to a work surface, in FIG. 9C for hooking to a pipe conduit and in 9D for suspension from a stud or the like.

Although the stand 14 is attached to the back of a holster 10 in the embodiment described herein, it is to be understood that the stand alternatively can be mounted directly to the back of an instrument housing.

Details of the holster 10 other than those necessary to describe the interconnection between the stand and holster, shall be omitted for brevity. In this regard, the particular holster, to which the stand embodied in this invention is attached, is described in U.S. Design patent application Ser No. 122,652 filed Nov. 13, 1987, and assigned to the assignee of this invention.

Two functional positions of the stand 14 are shown, respectively, in FIGS. 1 and 4, the former being a support position with the stand 14 pivoted open for supporting the holster 10, and the latter being a retracted position for storage. The back of the holster 10 is formed with a recessed region 16 within which the stand 14 is retained in its storage position.

Figure 2:
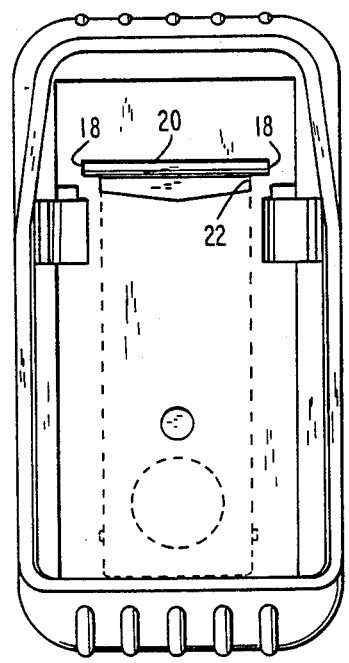
FIG. 2 is a front view of a holster, with stand in a retracted position.

At the upper end of the stand 14, there is a pair of outwardly extending pins 18, 18, which are formed at the ends of an upper bridge member 20 (FIG. 2). The pins 18, 18 are seated within a pair of corresponding collars 21 at the ends of a slotted opening 22 formed in the holster.

The stand 14 is assembled to the holster 10 by inserting the stand through the opening 22, from the front of the holster shown in FIG. 2, and passing the stand out the rear of the holster until the pins 18, 18 become seated in the collars 21. At this time, because the diameter of the pins 18, 18 is approximately the same as the inner diameter of the collars 21, the pins 18, 18 are seated relatively snugly in the collars (FIGS. 5A and 5B) so that friction is created between them. This enables the stand 14 to temporarily retain a particular angle with respect to the holster 10, to enable the user to pivot the stand open and position the holster on a support surface. using one hand.

Formed at the upper end of the stand 14 is an abutment member 24 which preferably extends laterally across the stand. The abutment member 24 is positioned on the outer surface of the stand 14, shown in FIG. 5A, so that it contacts the holster 10, just above the opening 22, when the stand is pivoted open, as shown in FIG. 5B. This retains the stand at a fixed angle for convenient viewing of the instrument by the user when the instrument is placed on a support surface.

Figure 3:
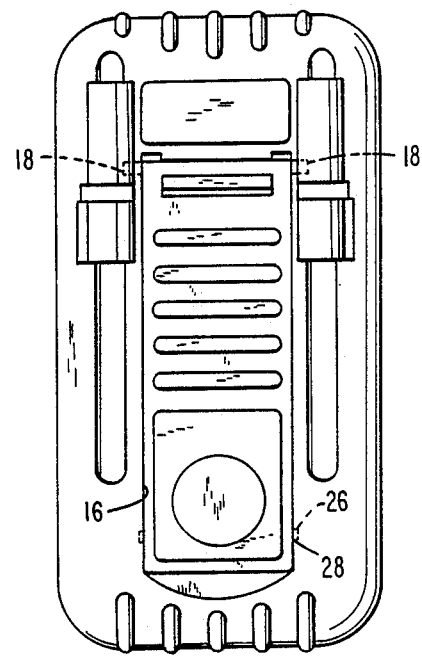
FIG. 3 is a rear view of the holster of FIG. 2.

Formed at the lower end of the stand 14 is a pair of retaining tabs 26 that is adapted to seat within corresponding recesses 28, in a side wall of recessed region 16 formed in the back of the holster, as shown in FIG. 3. The tabs 26 prevent the stand 14 from becoming unintentionally pivoted open when stored.

The particular construction of stand 14 is very important, as it provides the desired characteristics of being flexible, being non-brittle and having substantially no mechanical "memory". Referring to FIG. 6, forming the framework of the stand 14 is an underlying skeletal member or frame 30 that is formed of a pair of lengths of wire 32 of material that bends, is not brittle and when bent, retains its shape under loading by a holster and instrument. The wires 32 are formed of fully annealed cartridge brass, in accordance with the preferred embodiment. Although fully annealed cartridge brass wire has been selected as preferred as a result of extensive experimentation, it is probable that other materials are suitable as well. The wires 32 are spaced apart from each other, and maintained parallel, by a pair of plastic bridge members 34 and 36 that are molded around the ends of the wires, as shown in FIG. 6. The upper bridge member 34 is integral with member 20 in FIG. 2, and retains, at its ends, the pins 18. Similarly, tabs 26 are integral with the lower bridge member 36.

The skeletal member 30 is covered by a layer 38 of a thermoplastic polyester material, such as Kraton (TM), manufactured by Shell Chemical Company. The material Kraton (TM) is a styrene-ethylene/butylenestyrene material that is flexible and forms a relatively non-slippery surface. Bonding between the layer 38 and plastic bridges 34, 36 is enhanced by a number of through-holes such as 3a, 3a' formed in the bridges (FIG. 7).

At the lower end of the layer 38 is formed an aperture 40, having a diameter of approximately 1 inch, to receive a nail or stud for hanging the instrument as shown in FIG. 9D. A series of ribs 42, formed on the surface of the elastomeric layer 38, forms a non-slip surface for contact with a pipe or conduit, when hooked as shown in FIG. 9C.

The abutment member 24 is formed of elastomeric material, integral with elastomeric layer 38. Pins 18, 18 and tabs 26, which extend outwardly from the elastomeric layer 38, are not coated so that the stand is able to be easily pivoted on collars 22 between the two positions shown in FIGS. 1 and 4, and snapped into place in the storage region 16.

Although only a few stand configurations are shown in the drawings, it is to be understood that virtually an infinite number of different stand configurations are possible as a result of the ability of the stand to be manually configured in the manner described. Because the stand shown in FIGS. 6–8 has no mechanical "memory", there is no tendency of the stand to "creep" toward its previous configuration.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed:

1. A stand for supporting the housing of a measurement instrument, comprising:
   an elongated skeletal member extending outwardly from said housing and being formed of a material that is flexible, is non-brittle and has substantially no mechanical memory;
   a thermoplastic polyester material covering at least a portion of said skeletal member; and
   means for retaining one end of said stand to said housing.

2. The stand of claim 1, wherein said retaining means includes means for pivotally attaching said one end of said stand to said housing.

3. The stand of claim 2, wherein said retaining means comprises a pair of pivot pins extending outwardly from said one end of said stand, said pivot pins being adapted to be seated in receptacles formed in said housing.

4. The stand of claim 2, wherein said skeletal member is formed of annealed cartridge brass wire.

5. The stand of claim 1, including stand retaining tabs extending outwardly from opposite sides of said thermoplastic polyester material and adapted to be releasably retained in corresponding recesses formed in said material.

6. The stand of claim 1, including an abutment member formed on a planar surface of said thermoplastic polyester material near one end of said stand adjacent said housing, said abutment member being positioned such that said abutment member contacts a portion of said housing and limits further pivoting of said stand when said stand is pivoted to a predetermined angle with respect to said housing.

7. The stand of claim 1, including a series of parallel ribs formed on a planar surface of said thermoplastic polyester material, said series of ribs being adapted to form a non-slip region of said material when said stand is hooked around a pipe or conduit, or the like.

8. The stand of claim 1, wherein said stand includes an aperture formed therein for hanging said stand on a nail, stud, or the like.

9. A stand for supporting the housing of a measurement instrument, comprising:
   an elongated skeletal member extending outwardly from said housing and being formed of a material that is flexible, is nonbrittle and has substantially no mechanical memory, wherein said skeletal member includes a pair of lengths of annealed cartridge brass wire separated from each other and maintained parallel by a pair of bridge members provided respectively at opposite ends of said lengths of wire;
   a thermoplastic polyester material covering at least a portion of said skeletal member; and
   means for retaining one end of said stand to said housing wherein said retaining means includes means for pivotally attaching said one end of said stand to said housing.

10. The stand of claim 9, wherein said bridge members are formed of plastic molded around the ends of said lengths of wire.

11. A holster for supporting the housing of a measurement instrument, comprising:
    a receptacle for receiving a housing of said measurement instrument; and
    a stand for supporting said receptacle on or to a support member, said stand comprising
    (a) an elongated skeletal member extending outward from said receptacle and being formed of a material that is flexible, is non-brittle and has substantially no mechanical memory;
    (b) a thermoplastic polyester material covering at least a portion of said skeletal member; and
    (c) means for retaining one end of said stand to said receptacle.

12. The holster of claim 11, wherein said retaining means includes means for pivotally attaching said one end of said stand to said receptacle.

13. The holster of claim 12, wherein said retaining means comprises a pair of pivot pins extending outwardly from said one end of said stand, said pivot pins being adapted to be seated in recesses formed in said receptacle.

14. The holster of claim 12, wherein said skeletal member is formed of annealed cartridge brass wire.

15. The holster of claim 11, including stand retaining tabs extending outwardly from opposite sides of said thermoplastic polyester material and adapted to be releasably retained in corresponding recesses formed in said material.

16. The holster of claim 11, including an abutment member formed on a planar surface of said thermoplastic polyester material near one end of said stand adjacent said receptacle, said abutment member being positioned such that said abutment member contacts a portion of said receptacle and limits further pivoting of said stand when said stand is pivoted through a predetermined angle with respect to said receptacle.

17. The holster of claim 11, including a series of parallel ribs formed on a planar surface of said thermoplastic polyester material, said series of ribs being adapted to form a non-slip region of said material when said stand is hooked around a pipe or conduit, or the like.

18. The holster of claim 11, wherein said stand includes formed therein for hanging said stand on a nail, stud, or the like.

19. The holster of claim 18, wherein collars in said receptacle form said recesses for receiving said pins, said collars tightly wrapping said pins to cause friction therebetween so that the angle between said stand and said receptacle once manually set by the user tends to be temporarily retained.

20. A holster for supporting the housing of a measurement instrument, comprising:
    a receptacle for receiving a housing of said measurement instrument; and
    a stand for supporting said receptacle on or to a support member, said stand comprising (a) an elongated skeletal member extending outward from said receptacle and being formed of a material that is flexible, is non-brittle and has substantially no mechanical memory, wherein said skeletal member includes a pair of lengths of annealed cartridge brass wire separated from each other and maintained parallel by a pair of bridge members provided respectively at opposite ends of said lengths of wire; (b) a thermoplastic polyester material covering at least a portion of said skeletal member; and (c) means for retaining one end of said stand to said receptacle.

21. The holster of claim 20, wherein said bridge members are formed of plastic molded around the ends of said lengths of wire.

22. For an instrument housing or holster, a stand for supporting the housing or holster on or to a support member, said stand comprising:
   a framework formed of a pair of equal lengths of metal wire spaced apart and parallel to each other, and upper and lower bridge members for supporting, respectively, the upper and lower ends of said pair of wires;
   pivot pins formed on said upper bridge member for pivotally mounting said upper bridge member to said housing or holster; and
   a thermoplastic polyester material formed on said framework;
   whereby said stand is flexible, is non-brittle and has substantially no mechanical memory.

23. A stand for supporting the housing of a measurement instrument, comprising:
   a skeletal member extending from said housing, said skeletal member including at least two substantially equal lengths of wire equally spaced from each other and at lest one bridge member coupled to each of said lengths of wire, wherein said wire is flexible, non-brittle and has substantially no mechanical memory;
   means for pivotally attaching a first end of said stand to said housing; and
   means for releasably retaining a second end of said stand to said housing.

24. The stand of claim 23, wherein said means for pivotally attaching said first end of said stand to said housing includes a pair of pivot pins extending outwardly from said first end of said stand and being adapted to be seated in receptacles formed in said housing.

25. The stand of claim 23, wherein said means for releasably retaining said second end of said stand to said housing includes a thermoplastic polyester material covering at least a portion of said skeletal member and retaining tabs extending outwardly from said thermoplastic material and adapted to be releasably retained in corresponding recesses provided in said housing.

26. A holster for supporting the housing of a measurement instrument, comprising:
   a receptacle for receiving a housing of said measurement instrument; and
   a stand for supporting said receptacle on or to a support member, said stand comprising (a) a skeletal member extending from said receptacle, said skeletal member including at least two substantially equal lengths of wire equally spaced from each other and at least one bridge member coupled to each of said lengths of wire, wherein said wire is flexible, non-brittle and has substantially no mechanical memory, (b) means for pivotally attaching a first end of said stand to said receptacle, and (c) means for releasably a second end of said stand to said receptacle.

27. The stand of claim 26, wherein said means for pivotally attaching said first end of said stand to said receptacle includes a pair of pivot pins extending outwardly from said first end of said stand and being adapted to be seated said receptacle.

28. The stand of claim 26, wherein said means for releasably retaining said second end of said stand to said receptacle includes a thermoplastic polyester material covering at least a portion of said skeleton member and retaining tabs extending outwardly from said thermoplastic polyester material and adapted to be releasably retained in corresponding recesses provided in said receptacle.

* * * * *